United States Patent
Kaufold et al.

(10) Patent No.: US 6,551,664 B2
(45) Date of Patent: Apr. 22, 2003

(54) METHOD FOR MAKING ALUMINUM SHEET AND PLATE PRODUCTS MORE WEAR RESISTANT

(75) Inventors: Roger W. Kaufold, Pittsburgh, PA (US); Neville C. Whittle, Pittsburgh, PA (US); Daniel D. Roup, Bettendorf, IA (US)

(73) Assignee: Alcoa Inc., Pittsburgh, PA (US)

( * ) Notice: Subject to any disclaimer, the term of this patent is extended or adjusted under 35 U.S.C. 154(b) by 0 days.

(21) Appl. No.: 09/795,207

(22) Filed: Feb. 28, 2001

(65) Prior Publication Data

US 2001/0041221 A1 Nov. 15, 2001

Related U.S. Application Data

(63) Continuation-in-part of application No. 09/347,040, filed on Jul. 2, 1999, now abandoned.
(60) Provisional application No. 60/091,615, filed on Jul. 2, 1998.

(51) Int. Cl.[7] ................................................. C23C 4/04
(52) U.S. Cl. ........................ 427/447; 427/448; 427/449; 427/450; 427/451; 427/455; 427/456
(58) Field of Search ................................. 427/447, 448, 427/449, 450, 451, 455, 456

(56) References Cited

U.S. PATENT DOCUMENTS

| | | | | |
|---|---|---|---|---|
| 4,454,823 A | * | 6/1984 | Stoller, Sr. et al. | 105/423 |
| 4,822,415 A | * | 4/1989 | Dorfman et al. | 75/251 |
| 5,514,422 A | * | 5/1996 | McCune | 427/449 |
| 5,814,398 A | * | 9/1998 | Kronz et al. | 428/338 |
| 6,126,999 A | * | 10/2000 | Tomasino et al. | 427/426 |

OTHER PUBLICATIONS

Hawley's Condensed Chemical Dictionary, Twelfth Edition, Van Nostrand Reinhold Company, 1993, p. 71.*

* cited by examiner

Primary Examiner—Katherine A. Bareford
(74) Attorney, Agent, or Firm—Gary P. Topolosky

(57) ABSTRACT

A method for making an aluminum substrate that is subjected to repeated impaction more wear resistant. The method comprises applying at least about 0.005 inch thick coating of an amorphous composition directly to only portions of this substrate, preferably after it is shaped into a product for transporting consumable materials. The coating composition to which steel, aluminum, PTFE and/or polyethylene may be added, can be thermally sprayed to the substrate surface.

25 Claims, 5 Drawing Sheets

METHOD FOR MAKING ALUMINUM SHEET AND PLATE PRODUCTS MORE WEAR RESISTANT

CROSS REFERENCE TO RELATED APPLICATIONS

This application is a continuation-in-part of application Ser. No. 09/347,040, filed on Jul. 2, 1999, now abandoned, which claimed the benefit of U.S. Provisional Application Ser. No. 60/091,615, filed on Jul. 2, 1998, both disclosures of which are fully incorporated by reference herein.

BACKGROUND OF THE INVENTION

There is a need to improve the reliability and service life of transportation assets made from metal alloys like aluminum and steel. These assets, which come in repeated, harsh contact with the materials or media being hauled, support said materials in transport. The storage area for such materials usually consists of a pair of sidewalls, front wall and structural floor components. An example of one such application is a dump truck. Because of the design of most material transporters, it becomes necessary to tilt their storage areas to a relatively steep angle for emptying loads in entirety often through a rear tailgate. Under these conditions, the floor components of these dump bodies exhibit reduced wear resistance, and thereby diminishing overall service life of the trailer.

The foregoing problems worsen when the materials being hauled are glutinous, such as hot asphalt, and the trucks operate in varying temperature climates cyclically from hot to cold. In the latter environs, there is a tendency for material loads to stick or freeze to the dump body floors making unloading even more difficult. When these hauler tailgates are opened and dump bodies tilted, truck operators often resort to costly, more time consuming and sometimes dangerous techniques to release the loads hung up or frozen within their dump bodies. Such practices include backhoe assists, high pressure water washes and/or "slam dumping", each of which detrimentally impacts the equipment in question. It can also be a significant safety issue as some trailers can overturn in these processes.

Some stand alone liners are known for improving the service life of materials used to make dump body floor components. Representative truck liners include those set forth in U.S. Pat. Nos. 4,273,381, 4,752,098, 4,944,612, 5,518,285 and 5,662,374. Generally, such liner devices are costly, prove difficult to install, maintain and/or periodically replace, and sometimes create liner seams in the dump area that negatively impact efficiencies of the dump bodies into which they are installed.

Wear resistant materials are known for numerous high-performance tool applications including drill bits, scraper blades, bearings, cutting tools, chippers, rubbing seals, pump liners, valve inserts and thread guides. Representative compositions for such applications include those claimed and described in U.S. Pat. Nos. 4,725,512, 4,965,139 and 5,632,861.

SUMMARY OF THE INVENTION

It is a principal objective of this invention to improve the wear resistance performance, and also corrosion resistance, of metal stock used to manufacture materials transportation products for truck dump bodies and the like. It is another main objective of this invention to provide greater wear resistance to such transportation products by applying a wear resistant coating directly thereon. It is another objective of this invention to provide a method for applying variable thickness, wear resistant coatings across the length and/or width of such products to accommodate the varying wear resistant needs of said product. It is yet another objective to provide a method for applying different wear resistant coating compositions to varying areas of the same materials transportation product.

The method for accomplishing the foregoing objectives consists of applying at least about 0.005 inch thick coating of an amorphous or noncrystalline composition (after application) directly to the metal sheet, either prior to or after its formation into a materials transportation product. This composition, to which steels, aluminum alloys, polytetrafluoroethylene ("PTFE"), PTFE derivatives and/or high molecular weight polyethylenes may be added, is then thermally sprayed onto the substrate/metal sheet surface of this invention.

BRIEF DESCRIPTION OF THE DRAWINGS

Further features, objectives and advantages of this invention will be made clearer in the following detailed description made with reference to the accompanying drawings in which.

DESCRIPTION OF PREFERRED EMBODIMENTS

Figure 1A:
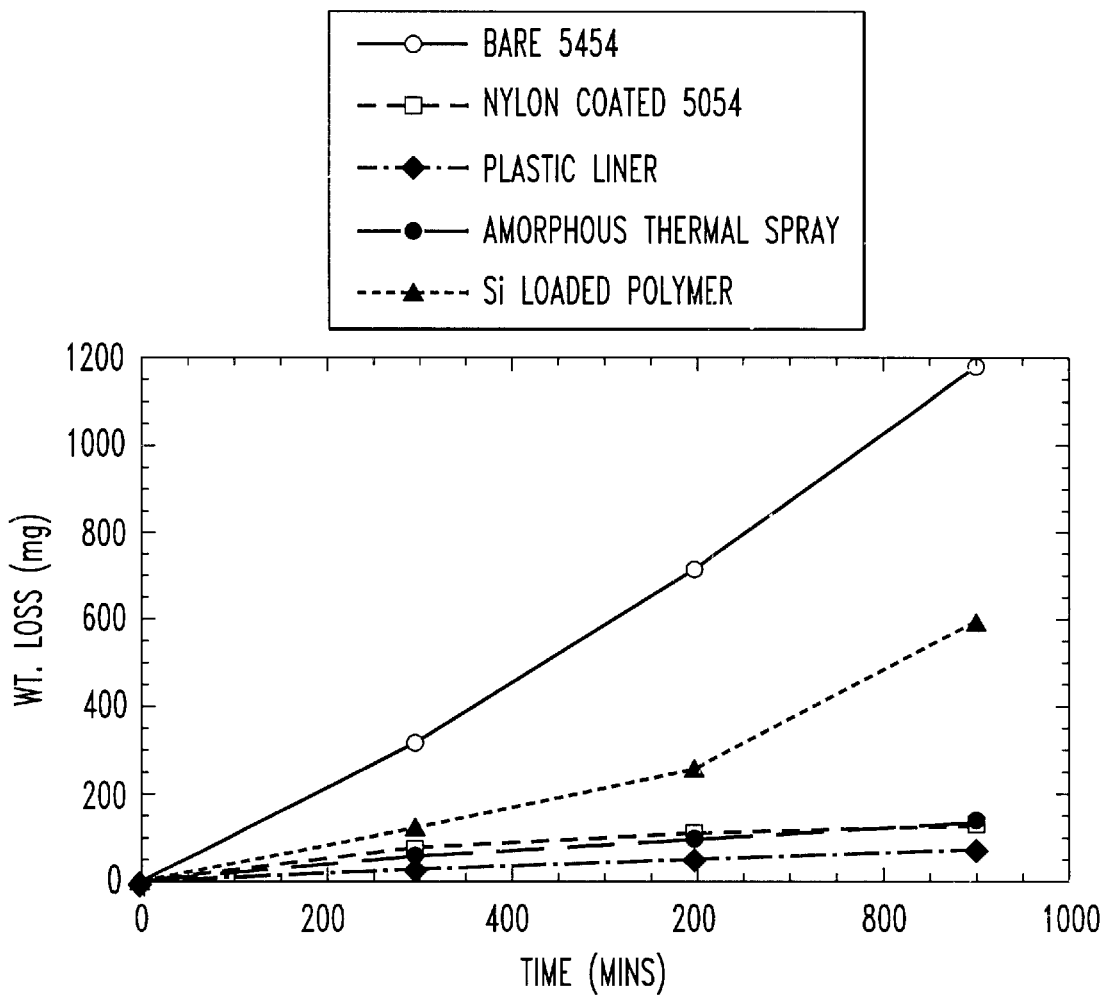
FIG. 1a is a graphic comparison of weight loss (in mg) over time (in min) for uncoated 5454 aluminum (Aluminum Association designation) versus a nylon coated equivalent and several alternative liner material test results.

This invention summaries a preliminary examination for applying coatings to the dump body floor components, and perhaps also tailgates, front and sidewall sections, for purposes of reducing wear and load freeze or hang up conditions and further enhancing dump body material corrosion resistance.

On a preferred basis, the coatings to be applied to such surfaces are by thermal spraying techniques that include but are not limited to electric arc, flame combustion, plasma arc, cold spraying, laser application and/or liquid atomization processes. Preferably, process energies are provided by known or subsequently developed oxygen/fuel combinations and/or by DC electric arcs. For instance, spray materials can be applied in the form of a wire, powder, powderfilled wire/cored wire, rod or any combination of these. Most preferably, these coatings are applied by a thermal spray, twin wire arc process. Other thermal spray technologies have also been considered for use according to this invention. These include combustion flame spraying (with wire, powder and/or rod), plasma spraying (with both single wire and powder) and high velocity spraying (with both wire and powder). Yet another alternative coating technology entails cold gas-dynamic spraying, a method as set forth for other end uses in U.S. Pat. No. 5,302,414. Industry experts sometimes refer to that process as Triboelectric Discharge/Kinetic Energy Metallization Spraying. Another process patent, U.S. Pat. No. 5,795,626, discloses additional particulars. Both of these disclosures are fully incorporated by reference herein.

After application, the coatings of this invention operate in either an as-deposited condition, or after some machining is performed thereon depending on the material being coated. In some instances, it may prove beneficial to impart some intentional polishing steps to the outer layers of coating for even greater load release/lubricity and increased wear resistance.

Preferred coatings to be applied include various types and combinations of metals, carbides, ceramics, composites and polymers, some of which are available in powder, wire, cord and/or rod forms. One particularly good performer is the family of Armacor coatings made and sold by Amorphous Technologies International. Armacor M™, for example, is an iron-based wire product in an alloy steel sheath. The particular chemical composition for that coating product includes Fe, Cr, Si, Mn and B. Another alternative coating is made and sold by Stoody Company as cored wire product 133-4B for twin arc thermal spraying. It is a combination of carbon steel and chrome carbon wires. Yet another Stoody product, 1334SPR, has shown good performance in preliminary spray forming results. Any of these amorphous coatings may be blended with metals, including aluminum alloys and stainless steels (like those from the 300 Series), and/or with PTFE derivatives or high molecular weight polyethylene compositions prior to application according to this invention.

When the foregoing amorphous alloys are blended with aluminum prior to deposition by thermal spraying or the like, it is believed that resultant layering on the floor components will be more ductile thus offering a beneficial increase in toughness and impact wear resistance. Aluminum additions to these coatings may also enhance coating bond strengths particularly to dump body components made from aluminum alloys. Suitable blends according to the invention include amorphous to metal component volume ratios ranging from about 3:1 to 1:2. In any event, the applied coatings of this invention may, and should, be customized for the substrates onto which they will be applied, whether these trailer/railcar/container or other transportation components are made from aluminum alloys, like 5454, 5083, or other 5000 or 6000 Series (Aluminum Association designations) aluminum sheet and plate products, steel alloys or other materials. With the application of different coating compositions and/or thicknesses, it is also possible to provide a surface-treated part with varying forms of protection across the length and/or width of a coated part. For instance, in a typical truck dump body, one portion of that body may be more susceptible to denting and require greater impact resistance while another area of that same body may need to be more resistant to sliding wear mechanisms such as abrasion. Different thicknesses of the same, or even different coatings, may be applied to these dump body areas to tailor the desired friction wear properties.

Thickness applications of these coatings may vary depending on coating material costs, the degrees to which coated substrates are exposed to abrasives and/or varying temperature conditions and other economic factors. Preliminary tests with an amorphous thermally sprayed coating, however, proved satisfactory with thickness deposits ranging from about 0.005 to about 0.015 inch. Even thicknesses as high as about 0.025 inch may prove satisfactory in certain aggressive wear areas. With respect to the accompanying FIGS. 2b and c, it should be noted that this invention addresses the possibility of applying protective coatings to only portions of the materials-contacting areas of a transportation product in varying thicknesses, either across the width or length of the transportation product. There may be instances where varying coating compositions are applied incrementally as well, for example, applying a more wear resistant coating in the areas where materials are first dumped into the trailer body, then a more self-lubricating or less-friction resistant coating nearer the exit area to this same trailer body, where wear resistance is less critical.

Such coatings should result in material contacting surfaces that are more resistant to impact and improved abrasion resistance than presently used, and typically uncoated materials. With properly coated storage areas, the adhesion and frictional forces between hauling media and the transportation device should decrease significantly. Hence, it is less likely that the transported media adhere to or freeze up within the devices themselves. Coatings according to this invention should also reduce maintenance and/or replacement costs.

This technology differs from the liner practices already well established in the media hauling industry in that such coatings may be applied: (1) directly to these transportation devices; (2) in a substantially continuous manner; and (3) perhaps even to the sheet or plate materials used to make such devices prior to their assembly. The latter advantage translates into a transportation device component protections which have no breaks or seams as deposited. Nor is any mounting hardware required unlike those associated with typical liner installations, such hardware being additional points of concern for corrosion problems and/or media hangups thus reducing material dumping efficiencies.

While the foregoing focus was on dump body components, it is to be understood that said coating processes may also be applied to other sheet and plate products, including railcars, livestock trailers, light truck beds, barges, certain treadsheets, intermodal containers and still other end uses produced from almost any type of metal.

Figure 2A:
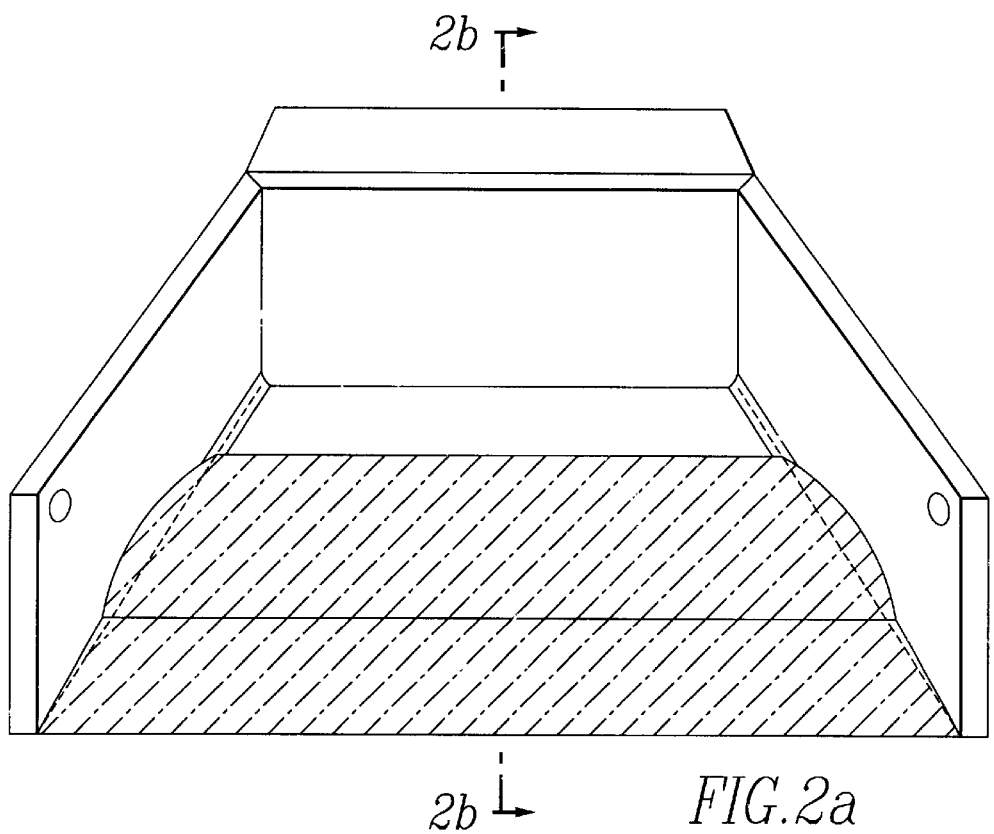
FIG. 2a is a schematic looking into the tilting end of a dump trailer body for illustrating which portions thereof are preferred coating according to one preferred embodiment of this invention.
Figure 2B:
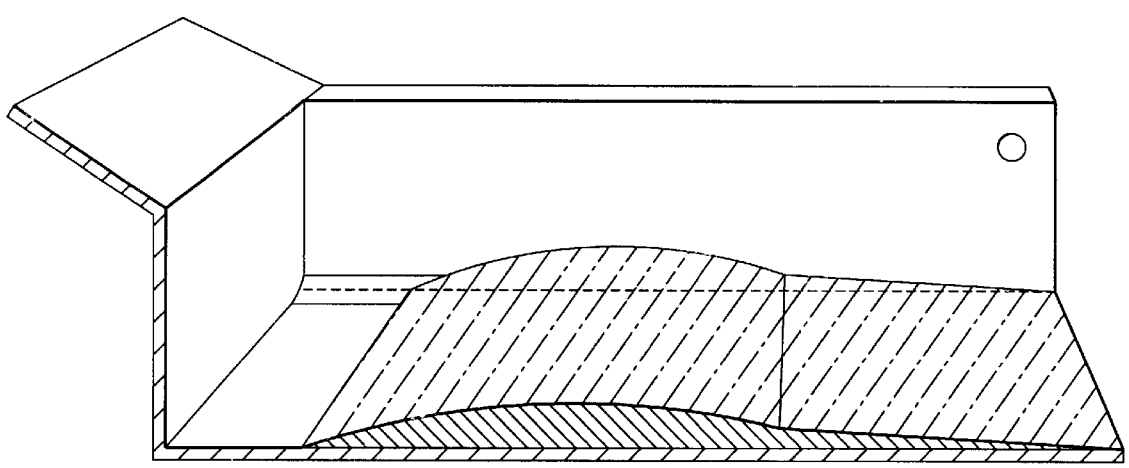
FIG. 2b shows, in cross-section, an alternative embodiment of this method wherein varying thicknesses of coating are applied across the length of this dump trailer body, said body having one or more curved regions.
Figure 2C:
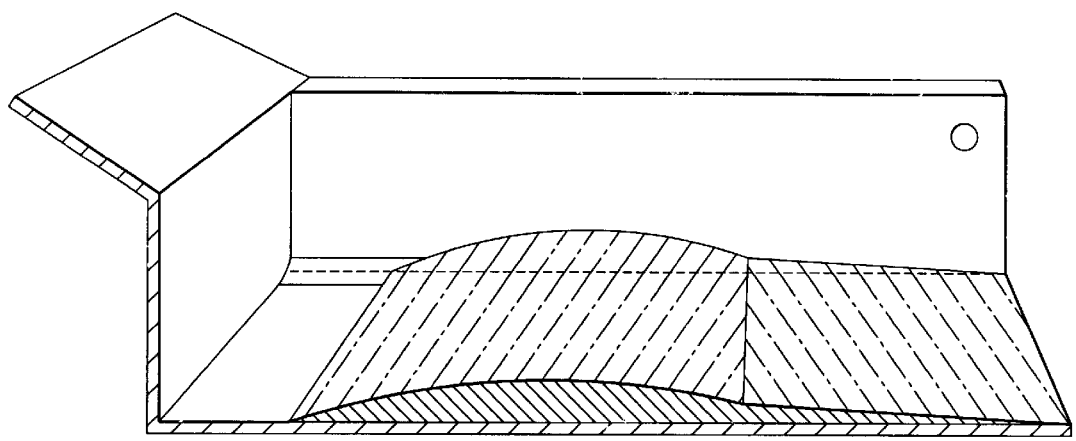
FIG. 2c shows the deposition of two distinct coating compositions along the length of this alternate embodiment of dump trailer body.

Turning now to FIG. 2a, it should be noted that greater efficiencies were observed when only portions of the materials-contacting area to a dump trailer body were coated according to preferred embodiments of this invention. When the entire base to this trailer body was first coated, some difficulties were observed when attempting to start the process for emptying the dump trailer's contents or load. It was believed that a fully coated base, while beneficial to the wear resistance of that dump trailer's base, actually hindered removal of the trailer body's contents. Accordingly, it is preferred that only portions of the dump trailer body that comes in repeated contact with consumable materials of any sort, e.g. dirt, stones, dried powders, coal, etc., be wear resistant coated hereby.

Figure 3:
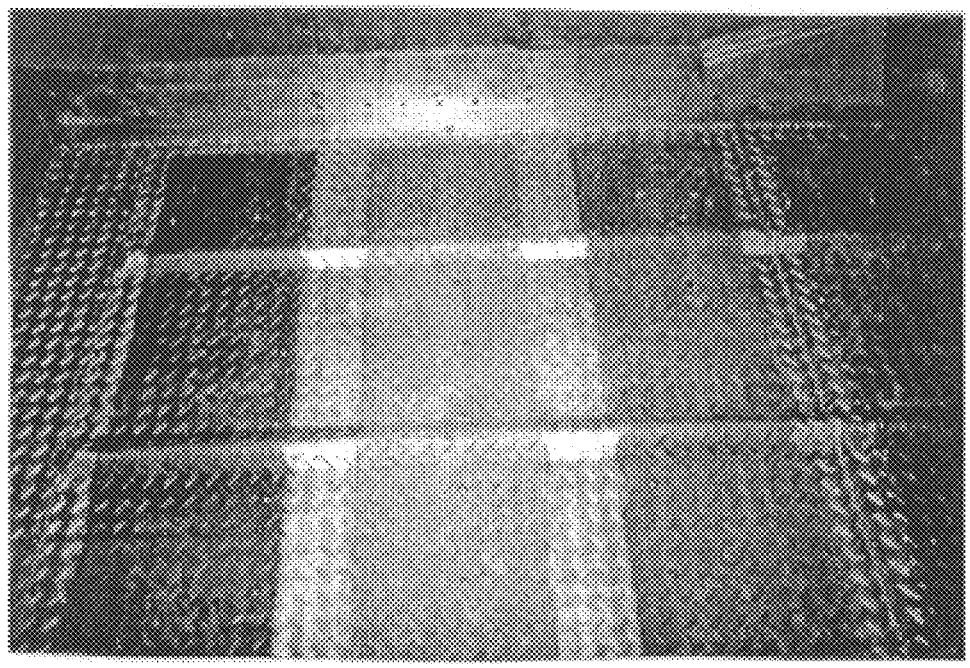
FIG. 3 is a computer generated illustration of treadstock used in the floors of a trailer or railcar bed for transporting livestock, said treadstock being coated in alternating portions according to one preferred embodiment of this invention.

Finally, with respect to FIG. 3, there is shown another preferred embodiment of this invention whereby treadsheet or plate (purposefully dimpled for greater livestock traction during transport) is coated in alternating sections, as shown in the light and darker gray regions of this computer generated illustration.

EXAMPLES

Figure 1B:
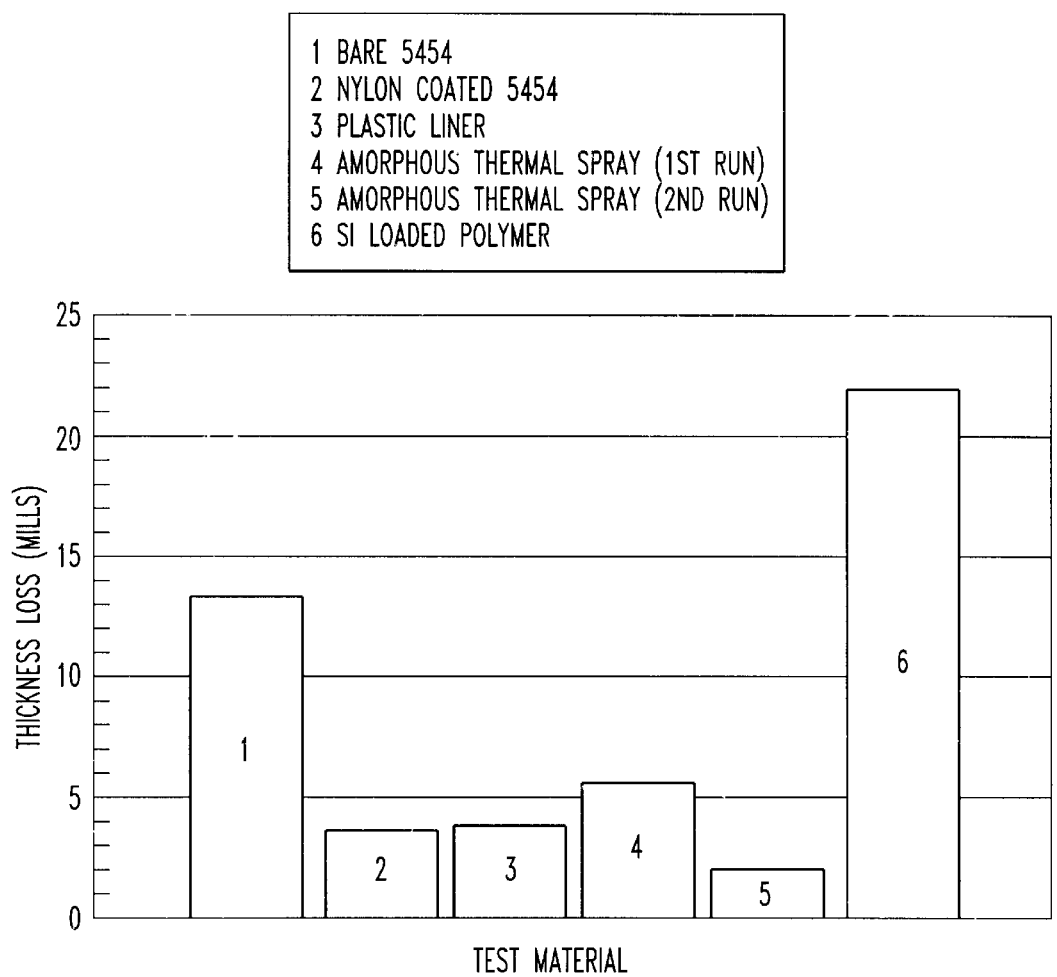
FIG. 1b is a graphic comparison of thickness loss (in mils) over time (in min) for the same comparative materials as in FIG. 1a, with a multiple run coating according to this invention added thereto.

Abrasive wear tests using 120 grit, silicon carbide (SiC) paper were conducted on specimens of bare 5454 aluminum, numerous samples of 5454 aluminum coated with comparative test materials and a known plastic lining material. For each set of wear tests, 8–10 measurements were taken and the results averaged. Weight and thickness loss per material tested is reported in following Table 1 and graphically summarized in accompanying FIGS. 1a and 1b, respectively.

TABLE 1

Weight and Thickness Losses from Wear Testing

| Sample | Total Wear Test Time (mins) | Wt. Loss (mg) | Average Thickness Change (mils) | Initial Coating Thickness (mils) |
| --- | --- | --- | --- | --- |
| Bare 5454 Aluminum | 15 | 1178 | 13.2 | — |
| Nylon Coated, 5454 Aluminum | 15 | 121 | 3.4 | 4.0 |
| Si Impregnated Polymer on 5454 Aluminum | 15 | 592 | 21.4 | 62.6 |
| Plastic Liner | 15 | 65 | 3.6 | 265 |
| Amorphous Thermal Spray Coated 5454 Aluminum, First Run | 15 | 128 | 5.3 | 12.6 |
| Amorphous Thermal Spray Coated 5454 Aluminum, Second Run | 30 | 119 | 1.6 | 7.3 |

From the above table, it should be noted that the amorphous thermal spray coated samples were comparatively subjected to additional wear tests of another 15 mins. (30 mins. total) to determine if weight and thickness losses might diminish, perhaps due to a "polishing effect" and "running-in" wear behavior from the initial wear tests. After the second runs, total average weight loss for the amorphous thermal spray coated 5454 samples was 247 mg and total average thickness loss 6.9 mils. However, total coating thickness losses, on average, were much less for Run #2 (1.6 mils) than Run #1 (5.3 mils) at about the same weight loss. This preliminarily indicates that after some break-in or "running-in" period, the wear performance of the coating improves. A possible explanation for this observation is that such coatings are much less porous below the surface. Hence, after initial break-in, or perhaps intentional polishing, coating performance will improve. On these small scale tests, it was also observed that rough coating surfaces fractured easier than their smooth, latter stage, second run counterparts.

Having described the presently preferred embodiments, it is to be understood that this invention may be otherwise embodied in the scope of the appended claims.

What is claimed is:

1. A method for making coated aluminum alloy materials transportation product or stock more wear resistant, said method comprising:
   applying a coating by thermal spraying at least about 0.005 inch thick of an amorphous composition to only certain portions, but not all, of materials-contacting areas of said materials transportation product or stock.
2. The method of claim 1 wherein said materials transportation product or stock is substantially planar.
3. The method of claim 1 wherein said materials transportation product or stock includes one or more curved regions.
4. The method of claim 1 wherein said materials transportation product or stock is made from a 5000 Series aluminum alloy (Aluminum Association designation).
5. The method of claim 4 wherein said 5000 Series alloy is 5083 or 5454 aluminum (Aluminum Association designation).
6. The method of claim 1 wherein said coating is applied to certain portions of said materials transportation product or stock after it has been shaped.
7. The method of claim 6 wherein said materials transportation product is selected from the group consisting of a dump trailer body, railcar, light truck bed, barge, intermodal container, trash hauler/hopper and a livestock trailer/railcar bed.
8. The method of claim 1 wherein said amorphous composition is a mixture having a metal-based component.
9. The method of claim 8 wherein said metal-based component is a steel alloy.
10. The method of claim 9 wherein said steel alloy is stainless steel.
11. The method of claim 8 wherein said metal-based component is an aluminum alloy.
12. The method of claim 8 wherein said metal-based component is a blend of steel and aluminum.
13. The method of claim 1 wherein said amorphous composition includes polytetrafluoroethylene or a derivative thereof.
14. The method of claim 1 wherein said amorphous composition is a mixture containing a polyethylene component.
15. The method of claim 1 wherein said materials transportation product or stock consists of treadplate.
16. The method of claim 1 wherein said amorphous composition is thermally sprayed onto certain portions of said substrate by a process selected from the group consisting of: electric arc, flame combustion and plasma arc spraying.
17. The method of claim 1 wherein said materials transportation product or stock is pretreated prior to being coated with said amorphous composition.
18. The method of claim 1 wherein said amorphous composition is applied at a thickness of about 0.025 inch or less.

19. The method of claim 1 wherein said amorphous composition is applied at varying thicknesses across the length and/or width of said materials transportation product or stock.

20. The method of claim 1 wherein said amorphous composition is a blend containing iron-based wire additions.

21. The method of claim 20 wherein said amorphous composition is a blend containing chromium carbide wire additions.

22. The method of claim 1 wherein said materials transportation product or stock has a first area onto which a first amorphous composition is applied and a second area onto which a second amorphous composition is applied.

23. A method for making an aluminum alloy-based, materials transportation product more wear resistant to repeated impaction, said transportation product selected from the group consisting of a dump trailer body, railcar, light truck bed, barge, intermodal container, trash hauler/hopper and a livestock trailer/railcar bed, said method comprising:

thermally spraying at least about 0.005 inch thick coating of an amorphous composition onto only certain portions, but not all, of the materials-contacting areas for said transportation product, said composition including an iron-based, chromium carbide component.

24. The method of claim 23 wherein said amorphous composition further contains a component selected from the group consisting of: stainless steel, aluminum alloy, polytetrafluoroethylene or its derivative, a polyethylene and combinations thereof.

25. The method of claim 23 wherein said thermal spraying is performed by a process selected from the group consisting of: electric arc, flame combustion and plasma arc spraying.

* * * * *